Figure 1:
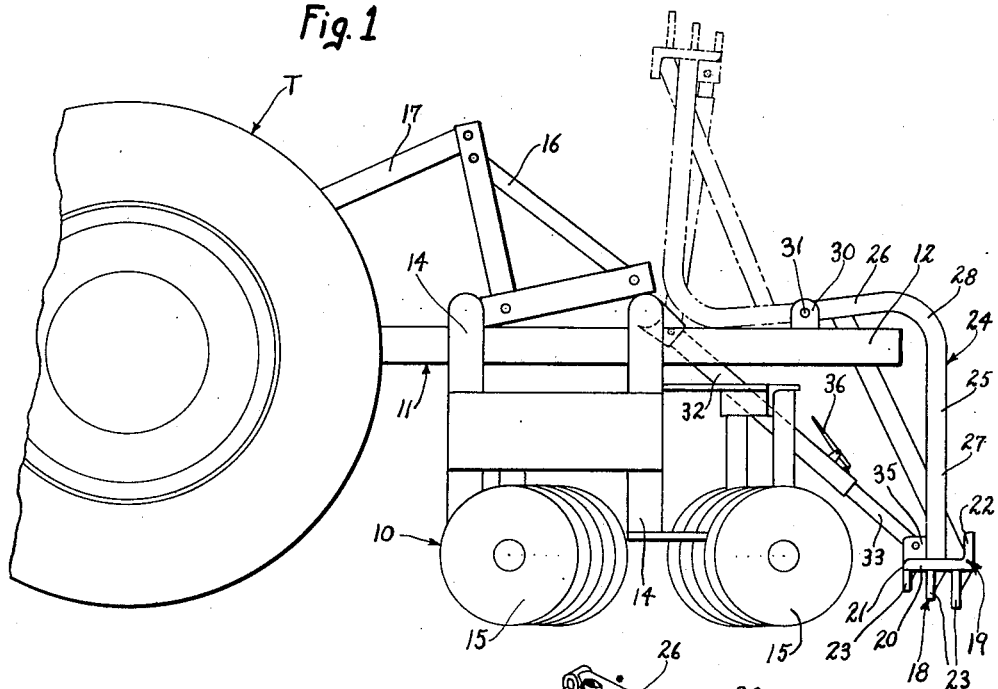

March 30, 1954 — M. T. BABINCHAK — 2,673,434
SCRAPER ATTACHMENT FOR DISK HARROWS
Filed May 29, 1950 — 2 Sheets-Sheet 1

INVENTOR.
MICHAEL T. BABINCHAK
BY
ATTORNEY

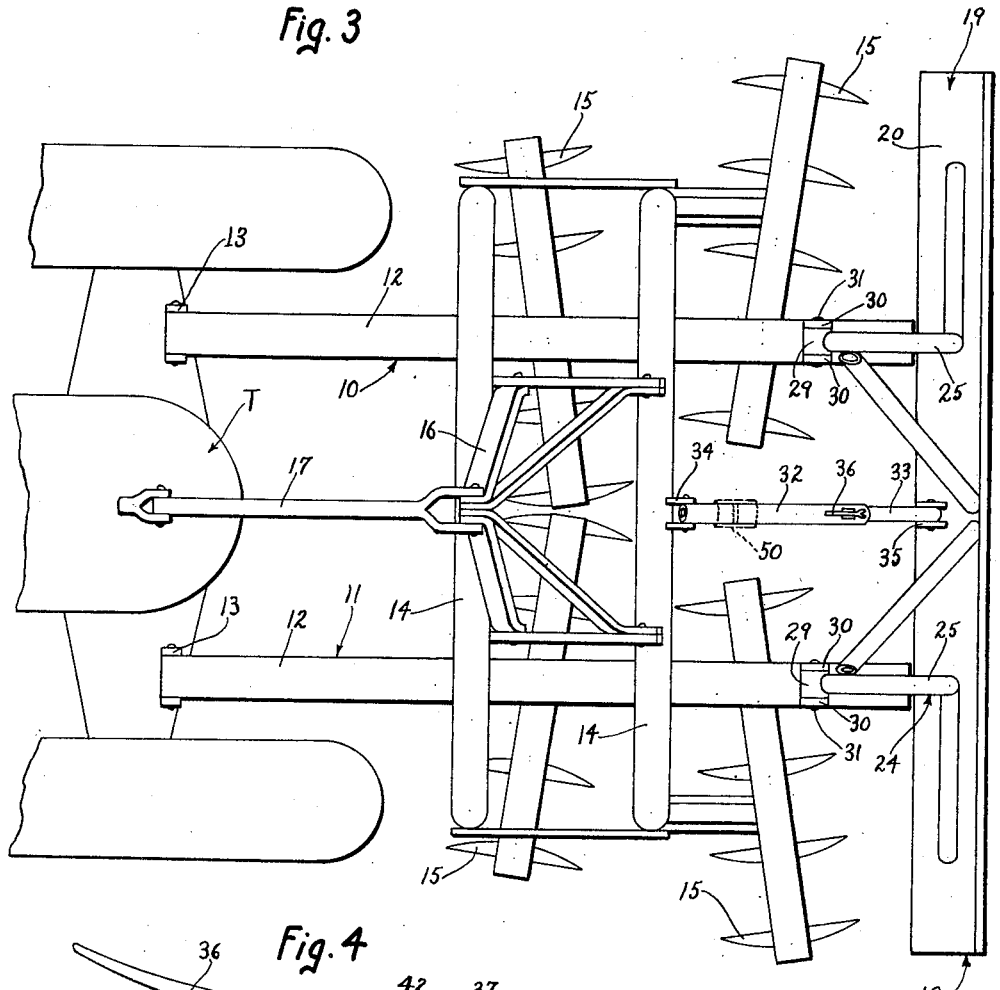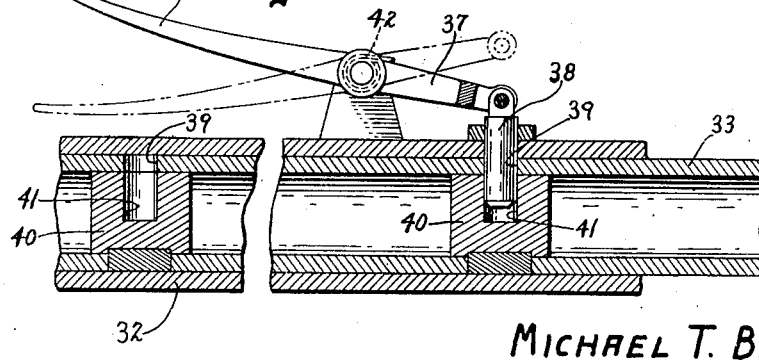

Patented Mar. 30, 1954

2,673,434

UNITED STATES PATENT OFFICE 2,673,434

SCRAPER ATTACHMENT FOR DISK HARROWS

Michael T. Babinchak, Warren, Ohio

Application May 29, 1950, Serial No. 164,913

5 Claims. (Cl. 55—23)

My invention relates to harrows, particularly to apparatus adapted to be attached to a conventional disc harrow, and the principal object of my invention is to provide new and improved apparatus of such character.

Conventional disc harrows are used to break up the ground and prepare it for planting. However, the ground is frequently broken into lumps of a size too large to facilitate planting operations, and further the broken ground is frequently thrown up in uneven relation. Thus, before planting operations could be started, it was heretofore necessary to break-up the large earth lumps and to level the ground by an operation in addition to the harrow operation.

My invention provides means connectable to a harrow in manner to follow the harrow for the purpose of breaking up earth lumps and to level the ground simultaneously with the harrow operation. My improved device may be used for moving earth, and thus may be used for grading and landscaping operations. After use of my device the ground is in condition for planting without any further operation.

Figure 2:
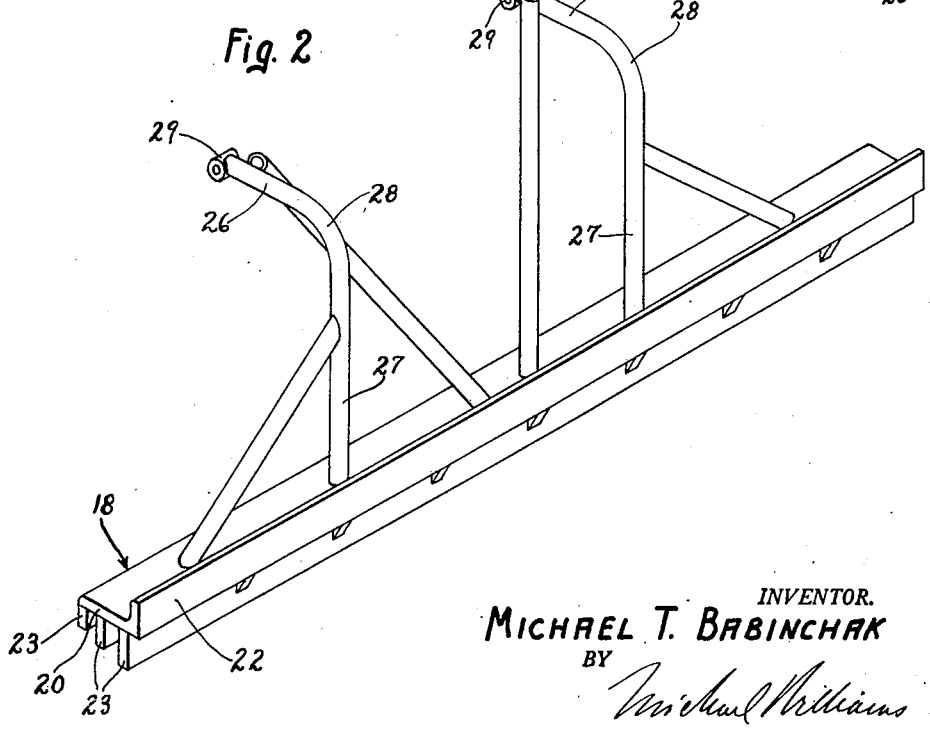

In the drawings accompanying this specification and forming a part of this application, there is shown, for purposes of illustration, an embodiment which my invention may assume, and in these drawings:

Figure 1 is a side elevational view of a disc harrow embodying my invention, the tractor for drawing the harrow being partially shown, and certain parts being shown in dot-dash lines in an alternate position, Figure 2 is a perspective view of the lump-reducing and ground leveling attachment, Figure 3 is a top plan view of the apparatus shown in Figure 1, and Figure 4 is an enlarged, fragmentary sectional view of a detail.

Referring to the drawings, the embodiment of the invention herein disclosed comprises a disc harrow 10, herein shown as drawn by a tractor T which may be of any commercially available type. The disc harrow 10 also may be of any suitable commercial design, and the type herein disclosed comprises a frame 11 formed by fabricated metallic members and including a pair of longitudinally extending angle pieces 12, each having one end pivotally connected to a portion of the tractor, as at 13. Transversely extending tubular members 14 are connected to the angle pieces 12, as by welding, and the discs 15 are carried by structure supported by the tubular members 14 in well known manner.

The harrow herein disclosed may be raised from operative position with respect to the ground, and for this purpose a bracket structure 16 is secured to and extends upwardly from the frame 11 and is pivotally connected to one end of a link 17, the other end being connected to motor means (not shown), such as a hydraulic cylinder.

A lump-reducing and ground leveling attachment 18 is shiftably carried by the frame 11 so that it may be readily shifted to operative or inoperative positions. In the presently disclosed embodiment the attachment comprises an elongated member 19, herein shown as of angle cross-section, one leg 20 being adapted to be disposed generally flat-wise with respect to the ground with its leading edge 21 behind the rear-most row of discs 15. The other leg of the member 19 provides a back-board 22 which prevents loose earth from freely sliding over the member 19.

Extending downwardly from the leg 20 is a series of ground-engaging teeth which are here shown in the form of a plurality of longitudinally extending spaced-apart plates 23, the plates progressively increasing in depth from the leading edge 21 of the leg 20 to its trailing edge.

Arm means 24 are provided for connecting the lump-reducing and ground leveling means to the frame, and in the presently disclosed embodiment a pair of tubular arms 25 are disclosed, each arm being of angular formation to provide a short leg portion 26 and a longer leg portion 27, such portions being preferably joined by a curved portion 28. The extremity of each leg portion 26 is provided with a bearing 29, and the extremity of each leg portion 27 is secured to the member 19, as by means of welding. Pairs of spaced-apart ears 30 are welded to the upper surface of the angle pieces 12, each pair of ears being adapted to receive a respective bearing 29, and a pivot pin 31 passes through the ears and bearing so that the arms 25 are pivotally connected to the frame 11.

In Figure 1 the arms 25 are shown in full line in position to dispose the lump-reducing and ground leveling device adjacent to the ground, and the dot-dash lines show the arms 25 swung about the pivots 31 to position wherein a portion of each arm spaced from the pivot rests on the top surface of a respective angle piece and thus holds the lump-reducing and ground leveling device in inoperative position.

Means are provided for releasably holding the arms 25 in either position, and in the embodiment herein disclosed such means comprises a pair of telescoping tubes 32 and 33, the tube 32 being pivotally connected to a pair of ears 34 welded to the rear-most tubular member 14, and the tube 33 being pivotally connected to a pair of ears 35 welded to the leg 20.

Latch means are provided to control telescoping action of the tubes 32 and 33, and in the presently disclosed embodiment a lever 36 is pivotally carried by the tube 32, the leg 37 of the lever pivotally carrying a plunger 38 which is adapted to fit into either one of two apertures 39 formed in the wall of the tube 33. A pair of reinforcing plugs 40 may be welded within the tube 33, each formed with a recess 41 in alignment with a respective aperture 39. The lever 36 may be urged to position wherein the plunger 38 is retained within either one of the aperture-recess 39—41 in any suitable manner, such as by means of a torsion spring 42.

In the position of parts shown in Figure 1, telescoping tubes 32, 33 are held in extended relation by the latch means to form a rigid strut which firmly holds the lump-reducing and ground leveling device in proper relation with respect to the ground. To swing the arms to dot-dash position, it is only necessary to move the lever 36 in a direction to release the plunger 38, whereupon the tubes 32, 33 may telescope to retracted relation as the arms 25 are swung to dot-dash position and, when such position is reached, the plunger 38 will be urged to seat in the other aperture-recess 39—41 so as to firmly hold the arms in such position.

The tube 32 may be formed in two sections joined by a coupling 50 shown in dotted lines in Figure 3. The coupling 50 may have left and right hand thread connection with the sections of the tube 32 so as to act in the manner of a turn-buckle to effect lengthening or shortening of the tube 32. Thus, adjustment is provided whereby the attachment 18 may be disposed a selected distance with respect to the ground line.

In operation, as the disc harrow 10 is drawn over the ground, assuming that the frame 11 is in its lower position, the ground will be turned up. The elongated member 20 follows the rearmost discs 15 and acts on the plowed ground to break up lumps and level the ground. The progressive depth of the longitudinal plates 23 provides for effective lump-breaking action, since the shorter leg is first to engage and break a lump, and the smaller lumps resulting from such action are further reduced by action of the other plates 23.

It will be apparent that my attachment is economical to manufacture and may be easily attached to any harrow of commercial construction.

In view of the foregoing, it will be apparent to those skilled in the art that I have accomplished at least the principal object of my invention, and it will also be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that my invention is not limited thereto.

I claim:

1. A disc harrow, comprising: a frame; ground leveling means adapted to extend cross-wise of the line of travel of said harrow and comprising an elongated member adapted to be disposed flat-wise to the ground and a series of longitudinally extending spaced-apart teeth extending downwardly from said member and increasing in depth from the leading to the trailing edge of said member; arm means for connecting said ground leveling means to said frame, comprising a plurality of tubular arms, each of angular formation and each having one end connected to said ground leveling means and its other end pivotally carried from a top surface of said frame, whereby said ground leveling means may be swung from operative position adjacent to the ground to inoperative position wherein said arms are swung to rest on said top surface; telescoping means pivotally connected to said frame and to said ground leveling means; and latch means for controlling movement of said telescoping means, said latch means releasably locking said ground leveling means in operative and inoperative positions.

2. The construction as specified in claim 1, and further including means for adjusting said elongated member toward and away from the ground when said ground leveling means is in operative position to adjust for depth of ground leveling by said elongated member.

3. A ground leveling attachment for a harrow including a rigid frame pivotally mounted on the rear of a tractor chassis and disc gangs carried by said frame to extend transversely of said tractor, the improvement comprising a ground leveling device carried by said frame in the rear of said gangs to break up lumps of ground turned up by said disc gangs and also to level the broken ground, said device comprising a sub-frame pivotally mounted on said harrow frame and including a rigid elongated transverse bar member engageable with the ground, said bar member being movable toward and away from the ground by pivotal movement of said sub-frame to adjust the depth of ground leveling by said bar, and strut means for rigidly holding said sub-frame in selected ground leveling position, comprising a pair of members, one pivoted to said harrow frame and the other pivoted to said sub-frame, said members being connected for extensible and retractable adjustment relative to each other and including means for holding said members in selected adjustment.

4. A ground leveling attachment for a harrow including a rigid frame pivotally mounted on the rear of a tractor chassis and disc gangs carried by said frame to extend transversely of said tractor, the improvement comprising a ground leveling device carried by said frame in the rear of said gangs to break up lumps of ground turned up by said disc gangs and also to level the broken ground, said device comprising a sub-frame pivotally mounted on said harrow frame and including a rigid elongated transverse bar member engageable with the ground, said sub-frame including angularly disposed arm portions and being swingable from an operative position wherein said transverse bar member is positioned adjacent to the ground to an inoperative position wherein said bar is swung clear of the ground and disposed over said harrow frame, at least one of said angularly disposed arm portions of said sub-frame resting against an upper surface of said harrow frame to support the sub-frame in inoperative position, and means for rigidly holding said sub-frame in selected ground leveling distance from the ground when said sub-frame is in operative position to adjust the depth of ground leveling by said bar.

5. The construction as specified in claim 4, and further including latch means for releasably locking said ground leveling device in operative and inoperative positions.

MICHAEL T. BABINCHAK.

References Cited in the file of this patent

UNITED STATES PATENTS

| Number | Name | Date |
|---|---|---|
| 869,660 | Schultz | Oct. 29, 1907 |
| 954,759 | Naylor | Apr. 12, 1910 |
| 1,241,775 | Shemwell | Oct. 2, 1917 |
| 1,480,996 | Coppinger | Jan. 15, 1924 |
| 2,440,550 | Martin | Apr. 27, 1948 |

FOREIGN PATENTS

| Number | Country | Date |
|---|---|---|
| 100,803 | Australia | Apr. 14, 1937 |
| 422,409 | Germany | Dec. 1, 1925 |
| 620,648 | Great Britain | Mar. 28, 1949 |